Jan. 5, 1937.  S. D. BUTTERWORTH  2,066,714
CAR LOADING DEVICE
Filed Nov. 21, 1934
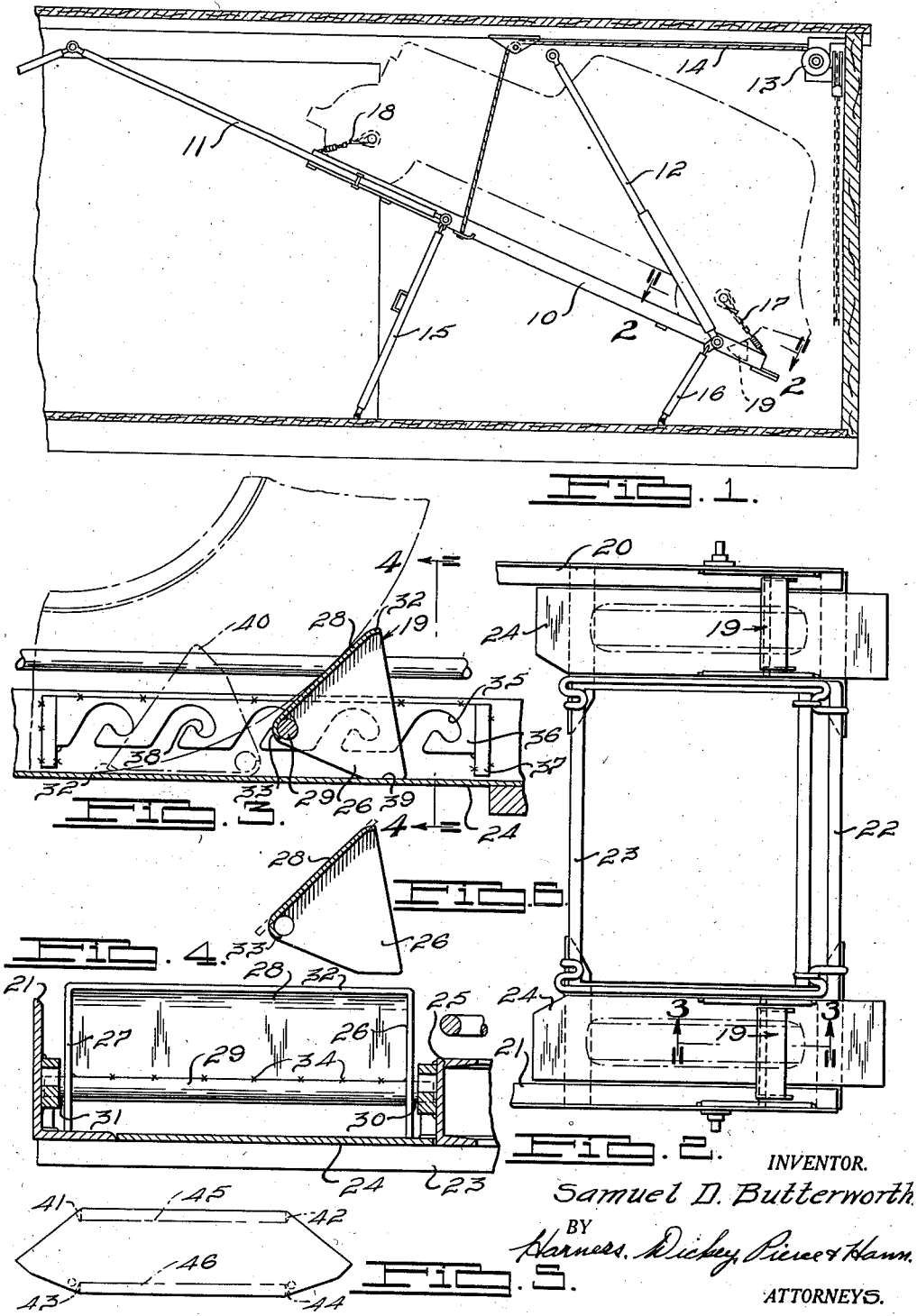
INVENTOR.
Samuel D. Butterworth
BY
Harness, Dickey, Pierce & Hann.
ATTORNEYS.

Patented Jan. 5, 1937

2,066,714

UNITED STATES PATENT OFFICE 2,066,714

CAR LOADING DEVICE

Samuel D. Butterworth, Detroit, Mich., assignor of ninety-nine per cent to The Worth Company, a corporation of Michigan Application November 21, 1934, Serial No. 754,013

10 Claims. (Cl. 105—368)

The invention relates to car loading devices and it has particular relation to a device for loading automobiles in freight cars.

Particularly, the invention involves an improvement in an automobile decking plane such as disclosed in my co-pending application for patent, Serial No. 646,830, filed December 12, 1932. In that application for patent a frame is provided which initially is disposed on the floor and then an automobile is rolled upon the frame and after securing or anchoring the automobile in position on the frame, the latter is elevated into a semi-decking position. As disclosed in said application for patent, the wheels of the automobile rest in short channelways at opposite ends of the frame and the automobile is anchored in position by means of chains connected to the frame and to the axles of the automobile.

One object of the present invention is to provide a frame for elevating the automobile to a semi-decking position, which has an adjustable chock for engaging the wheels at one end of the automobile so as to position the latter in an adjustable manner and also prevent its movement after the frame is elevated.

Another object of the invention is to provide a chock block which is permanently connected to the frame and which may be moved to a position where it will not interfere with the rolling of a wheel thereover.

Another object of the invention is to provide a method of constructing an adjustable chock block principally from sheet metal, so as to obtain a very strong and rigid construction and one which may be manufactured inexpensively.

Other objects of the invention will become apparent from the following description, the drawing relating thereto, and from the claims hereinafter set forth.

For a better understanding of the invention, reference may be had to the accompanying drawing illustrating one form of the invention, wherein:

Fig. 1 is a longitudinal and cross-sectional view of a freight car illustrating the manner in which a semi-decking frame, constructed according to the invention, is employed for holding the automobile in position.

Fig. 2 is a cross-sectional view on a larger scale taken substantially along the line 2—2 of Fig. 1.

Fig. 3 is a cross-sectional view on a larger scale taken substantially along the line 3—3 of Fig. 2.

Fig. 4 is a cross-sectional view taken substantially along the line 4—4 of Fig. 3.

Fig. 5 illustrates a strip of sheet metal from which the chock is manufactured.

Fig. 6 is an end view of the chock block and illustrating the method in which the sheet metal is shaped and associated with the rod projecting therethrough.

Referring to Fig. 1, the semi-decking frame is indicated at 10 and is pivotally connected to the upper part of the freight car by means of forward rods 11 and rear, telescopic rods 12. A chain hoist 13, including cables 14, is employed for elevating the frame and when it is in its semi-decking position it is supported by brace rods 15 and 16. For holding the automobile on the frame chain devices 17 and 18 are employed respectively at opposite ends of the frame and these chains prevent forward and rearward movement of the automobile on the frame. This construction, its arrangement and its manner of operation are fully disclosed in the co-pending application for patent above identified. While the use of these chains has been entirely satisfactory, it will be apparent that the front chains are subjected to a greater strain than the rear chains owing to the fact that the automobile is supported on an inclined plane and it is the front chains which prevent it from moving downwardly. The present invention is concerned chiefly with the provision of an additional support for preventing downward movement of the automobile on the frame, and as illustrated in Fig. 1 is in the form of chock blocks 19 mounted on the rear end of the frame and engaging the rear wheels.

Referring to Figs. 2, 3 and 4, it will be noted that the frame 10 includes side angle irons 20 and 21 interconnected at their ends as generally indicated at 22 and 23. At each corner of the frame a pan 24 is provided for receiving the wheels of the automobile and at the inner sides of the pans channel shaped members 25 are provided which, in conjunction with the side irons 21, provide channelways through which the wheels roll upon the pan. The pans project beyond the rear end of the frame structure and this is advantageous for accommodating automobiles or trucks which have an extraordinary length of wheel base.

The chock block 19 as best shown by Figs. 3 and 4, comprises a U-shaped element having legs 26 and 27 which are joined by a plate portion 28. A round bar 29 projects through openings in the legs 26 and 27 at the lower edge of the plate portion 28 and this bar has end portions 30 and 31 projecting beyond the side of the legs as best shown by Fig. 4. The upper edge of the plate portion 28 is bent over slightly as indicated at 32 and the lower edge adjacent the bar 29 is partially curled around the latter as indicated at 33 and is welded thereto as indicated at 34. Additionally, the legs 26 and 27 are welded to the ends of the bar so that the completed construction is very rigid and strong. The projecting ends 30 and 31 of the bar are adapted to selectively fit in a plurality of longitudinally spaced slots 35 provided in bars 36 having laterally projecting leg portions 37 at their ends, and such bars and leg portions are welded respectively to the side member 21 and the channel member 25. Each of the slots extends upwardly in an inclined direction and then terminates in a downwardly and oppositely inclined and closed end portion 38, and it is to be understood that the slots on one bar laterally coincide with the slots on the other and are of the same shape. It will be noted that the bars 36 are spaced from the pan 24 so as to provide longitudinal slots under the bars and that the ends of the slots are closed by the legs 37.

The chock block 19 is shown in its operative position in Fig. 3 wherein the projecting ends 30 and 31 of the bar 29 rest in the closed end portion 38 of the slots 35 and it may be noted at this time that the legs 26 and 27 of the blocks have short edge surfaces 39 that engage the pan 24 so as to firmly support the chock block on the pan when the automobile wheel is resting against the plate portion 28. When it is desired to adjust the position of the chock block in a longitudinal direction, it is only necessary to so move the block that the ends of the bar 29 move out of the slots 35 and to shift the block longitudinally during which adjustment the ends of the bar may move under the bars 36 and in the space between such bars and the pan 24. Then the bar may be moved upwardly into another of the recesses and again be positioned as shown by Fig. 3.

This adjustability of the chock block enables accommodating wheel base lengths which vary but occasionally, a truck or automobile has a wheel base of such length that it is necessary for the rear wheels to be positioned in close proximity to the ends of the pans 24 in which event the chock blocks could not be used. When this situation is encountered, it is only necessary to turn each chock block counter-clockwise as seen in Fig. 3 until it is in the position indicated in broken lines at 40, where the plate portions 28 then rest upon the pan 24. When the blocks are so positioned, the wheels may roll over the plate portions 28 and between the legs 26 and 27 until the wheel is in the desired position, after which the chains 17 and 18 are used to anchor the automobile on the frame.

The curled over portion 33 not only enables obtaining a more rigid connection between the base 28 and bar 29, but also facilitates and enables turning of the block from its position shown in broken lines at 40, substantially about the axis of the bar 29. This enables holding the depth of the longitudinal slots below the bars 36 to dimensions substantially equal to the diameter of the bar plus the thickness of the base portion 28. The bent over edge 32, as shown by Fig. 3, serves as a finger hold when the block is to be turned from its position indicated at 40.

The length of the block is such that the legs 26 and 29 are close to the opposing bars 36, and the width of the slots 35 is substantially equal to the diameter of the bar 29. These factors, plus the factors that the inclined portions of the slots 35 are not long, that the width of the longitudinal slots under bars 36 is only slightly greater than the diameter of the bar 29, and that the ends of such longitudinal slots are closed, prevent removal of the block after it is installed. Thus the blocks constitute a permanent part of the assembly.

It will be apparent that a chock block is provided which may be adjusted longitudinally of the rear end of the frame so that it may be used for supporting wheel bases which vary in length thereby removing some of the strain from the front chain devices 18. It will also be apparent that if the automobile or truck being loaded on the frame is exceptionally long and it is necessary to support the rear wheels closely adjacent to the rear ends of the pans, the chock blocks may be turned into inoperative positions, such as indicated in broken lines in Fig. 3 and when so positioned, the wheels may be rolled between the legs of the blocks and over the plate portions 28 and then fastened down solely by the chain devices.

In constructing the block, a sheet of metal such as shown in Fig. 5 is provided and initially V-shaped notches 41 and 42 are provided in the upper edge of the strip and V-shaped notches 43 and 44 in the lower edge of the strip. The substantially V-shaped ends of the strip are then bent over so as to provide a U-shaped construction, the line of bending being substantially in line with the inner edges of the notches at each end of the strip. Then the upper edge of the strip is bent over along the line indicated at 45 until it engages the then bent over legs, after which the junctions are welded. Following this the lower edge of the strip is bent over along the line indicated at 46 to provide the curved portion 33 previously mentioned, and then the junctions at the ends of the bent over portion are welded. Following this operation, the legs are provided with openings for receiving the bar 29 and the latter is inserted and welded, as previously described.

While only one form of the invention has been described and illustrated in detail, it will be apparent to those skilled in the art that various modifications may be made without departing from the scope of the appended claims.

I claim:

1. In combination, a support, bars at the sides of the support connected thereto and vertically spaced therefrom and having spaced notches extending upward from their lower edges and terminating in reversely directed and closed ends, a chock block between the bars, and pin elements projecting from the block and into the spaces between the lower edges of the bars and the support, said pin elements being slidable longitudinally in said spaces and being movable upwardly selectively into the notches and then downwardly in the closed ends, whereby the block may be held in various positions of longitudinal adjustment.

2. In combination, a support for an automobile wheel, a U-shaped chock block, means mounting the block on the support so that it may be turned into an operative position with its base portion directed upwardly at an angle to the vertical for engaging the wheel with the legs of the block resting on the support or turned to an inoperative position where the base portion is lowermost and rests on the support so as to allow the wheel to roll over such base portion and between the legs, and means for enabling an adjustment of the block along the support while still allowing movement of the block to the operative and inoperative positions at various positions of adjustment.

3. In combination, a support for an automobile wheel, a U-shaped chock block, means mounting the block on the support so that it may be turned into an operative position with its base portion directed upwardly at an angle to the vertical for engaging the wheel with the legs of the block resting on the support or turned to an inoperative position where the base portion is lowermost and rests on the support so as to allow the wheel to roll over such base portion and between the legs, means for enabling an adjustment of the block along the support while still allowing movement of the block to the operative and inoperative positions at various positions of adjustment, and means for preventing removal of the block from the support.

4. In combination, a support for an automobile wheel, means providing a longitudinally extending guideway at each side of the support and slots extending upwardly from each guideway at longitudinally spaced points and which terminate in longitudinally directed and closed end portions, a U-shaped chock block between said guideways, and trunnions on the ends of the block and movable longitudinally in the guideways and selectively into the slots, whereby the block may be adjusted along the support and anchored in the slots selectively.

5. In combination, a support for an automobile wheel, means providing a longitudinally extending guideway at each side of the support and slots extending upwardly from each guideway at longitudinally spaced points and which terminate in longitudinally directed and closed end portions, a U-shaped chock block between said guideways, and trunnions on the ends of the block and movable longitudinally in the guideways and selectively into the slots, whereby the block may be adjusted along the support and anchored in the slots selectively, said block being so arranged that its legs are adapted to rest on the support when the trunnions are in the closed ends of the slots and when the base portion of the block is in an upwardly directed and wheel engaging position.

6. In combination, a support for an automobile wheel, means providing a longitudinally extending guideway at each side of the support and slots extending upwardly from each guideway at longitudinally spaced points and which terminate in longitudinally directed and closed end portions, a U-shaped chock block between said guideways, and trunnions on the ends of the block and movable longitudinally in the guideways and selectively into the slots, whereby the block may be adjusted along the support and anchored in the slots selectively, said block being so arranged that its legs are adapted to rest on the support when the trunnions are in the closed ends of the slots and when the base portion of the block is in an upwardly directed and wheel engaging position, and means closing the ends of the guideways so as to prevent removal of the blocks.

7. In a car loading device, in combination, a frame for supporting an automobile and having a support at one end adapted to support a wheel of said automobile and to allow the wheel to roll thereon; a chock block on the support for engaging the wheel and supporting the automobile on the frame and having a base and spaced legs; and means pivotally connecting the block to the frame for rotation in a plane substantially parallel to the plane of the wheel for allowing the block to be moved to a position where the base of the block rests on the support and will not impede movement of the wheel over the support.

8. In a car loading device, in combination, a frame for supporting an automobile and having a support at one end adapted to support a wheel of said automobile and allow the wheel to roll thereon; a channel shaped chock block on the support for engaging the wheel to support the automobile on the frame and having a base and spaced legs; and means movably mounting the block on the support so that in one position the wheel contacts a surface of the base and is blocked by the base and in another position the base of the block rests on the support and the wheel is free to roll between the legs and over the base.

9. In a car loading device, in combination, a frame for supporting an automobile and having a support at one end shaped to support a wheel of said automobile and allow the wheel to roll thereon; a channel shaped chock block on the support for engaging the wheel to support the automobile on the frame and having a base and spaced legs; and means forming a pin and slot connection between the block and the support, permitting movement therebetween so that in one position the wheel is blocked by a surface of the base and in another position the surface of the base of the block rests on the support and the wheel is free to roll between the legs and over the base.

10. In combination, a support having spaced substantially parallel sides; laterally aligned notches in said sides extending upwardly from their lower edges and terminating in reversely directed closed ends, a chock block between the sides, and pin elements projecting from the block and into the notches, said pins being slidable longitudinally and pivotable in said notches, whereby the block may be rotated and also moved bodily with respect to the support.

SAMUEL D. BUTTERWORTH.